(12) United States Patent
Gabryjelski et al.

(10) Patent No.: US 7,995,754 B2
(45) Date of Patent: Aug. 9, 2011

(54) RECORDATION OF ENCRYPTED DATA TO A RECORDABLE MEDIUM

(75) Inventors: Henry P. Gabryjelski, Seattle, WA (US); Garrett Jacobson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 906 days.

(21) Appl. No.: 11/948,333

(22) Filed: Nov. 30, 2007

(65) Prior Publication Data
US 2009/0141893 A1    Jun. 4, 2009

(51) Int. Cl.
G06F 12/14    (2006.01)
(52) U.S. Cl. ........................................ 380/201
(58) Field of Classification Search .................. None
See application file for complete search history.

(56) References Cited

U.S. PATENT DOCUMENTS

| 6,957,343 | B2 | 10/2005 | Ripley et al. | |
|---|---|---|---|---|
| 7,017,100 | B2 | 3/2006 | Kojima et al. | |
| 7,200,085 | B2 | 4/2007 | Kanda et al. | |
| 2003/0070083 | A1* | 4/2003 | Nessler | 713/193 |
| 2003/0081777 | A1 | 5/2003 | Brondijk et al. | |
| 2005/0038997 | A1 | 2/2005 | Kojima et al. | |
| 2005/0154682 | A1 | 7/2005 | Taylor | |
| 2006/0023598 | A1 | 2/2006 | Babinski et al. | |
| 2006/0078111 | A1 | 4/2006 | Hollar | |
| 2006/0140108 | A1 | 6/2006 | Schreiber | |
| 2006/0239462 | A1* | 10/2006 | Staring et al. | 380/277 |
| 2007/0088898 | A1 | 4/2007 | Gabryjelski | |
| 2007/0250719 | A1* | 10/2007 | Lai et al. | 713/190 |

OTHER PUBLICATIONS

Moradzadeh, et al., "Licensing Requirements for the CSS DVD Copy Protection Method" Intel Corporation 1997. 17 Pages.
Bloom, et al., "Copy Protection for DVD Video", Proceedings of the IEEE, vol. 87, Issue 7, Jul. 1999 pp. 1267-1276.
Intel Corporation, et al., "Content Protection for Recordable Media Specification", Network Download Book, Aug. 5, 2004. 21 Pages.

* cited by examiner

*Primary Examiner* — David J Pearson

(57) ABSTRACT

Systems and methods of recording data are disclosed herein. A secure storage area is received from a host device. The secure storage area is indicative of a portion of a memory of the recordable medium to be recorded with encrypted data. A write command is received from the host device. The write command can include at least one data block to be written to the recordable medium and a memory address indicative of a start address where the at least one data block is to be written on the recordable medium. The memory address and the secure storage area can be compared to determine whether the at least one data block falls within the secure storage area. An encryption indicator in the at least one data block can be checked to determine whether the data on the at least one data block is encrypted. If the encryption indicator indicates that the data in the at least one data block is encrypted and if the at least one data block falls within the data range an encryption bit associated with the at least one data block can be set.

20 Claims, 5 Drawing Sheets

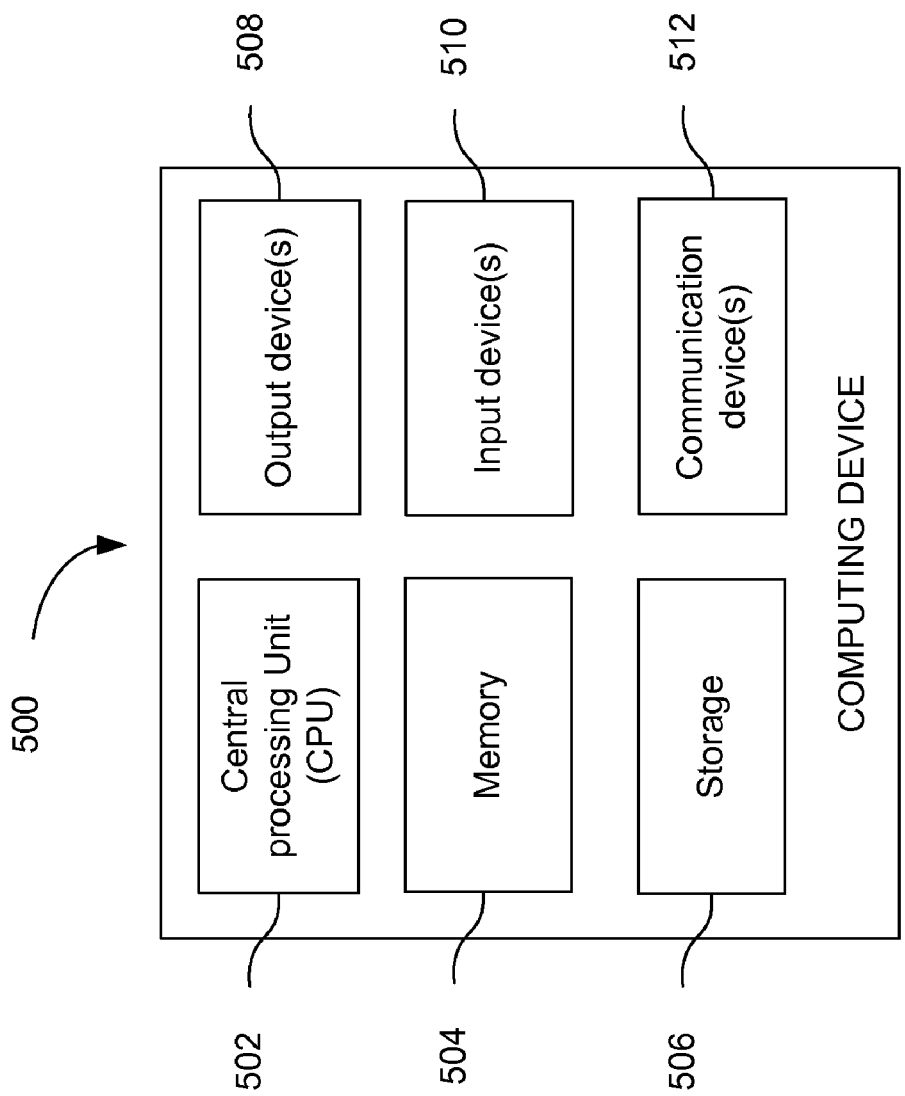

RECORDATION OF ENCRYPTED DATA TO A RECORDABLE MEDIUM

BACKGROUND

Recording data to media, such as DVD-Video discs, generally necessitates incorporating anti-piracy mechanisms to prevent the illegal reproduction of the recorded content. Various Digital Rights Management (DRM) schemes have been developed to prevent such illegal reproduction. For example, Content Scramble System (CSS) is a technology used pervasively on commercially produced DVD-Video discs. CSS decryption/encryption keys, such as title and disc keys, are licensed to manufacturers who incorporate them into products such as DVD drives, DVD players and DVD-Video discs.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Described herein are various techniques and technologies directed to recording, in real-time, encrypted and non-encrypted data to a recordable medium. Although the term encrypted typically refers to cryptographically strong modification of data, it also includes systems which scramble the data. Similarly, decryption and related terms can include descrambling operations. The encrypted data is recorded with a decryption key as well as an indicator that the data is encrypted. A recording device can be configured to determine whether the data to be recorded is encrypted by checking an encryption indicator embedded within the data.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 5 illustrates a component diagram of a computing device for implementing one or more embodiments.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented as a system for recording data in the context of video discs, it is also contemplated the data recorded can be any type of data or media content, and any type of recordable media can be used. As such, the system described is provided as an example and not a limitation. As those skilled in the art will appreciate, the present examples are suitable for application in a variety of different types of preferred items list management.

Described herein are various techniques and technologies directed toward an implementation of recording encrypted and non-encrypted data. In one example, the data is video data and is encrypted using content scramble system (CSS). The data can be recorded sequentially to a rewritable, recordable media in such a way that pre-specified areas of the recordable medium (e.g., a disc) may include encrypted sectors. These areas are referred to herein as secure storage areas. Other areas of the disc are areas that do not include any encryption.

A host device can send multiple data blocks to be written to a recordable medium. In one example, each data block to be written contains enough data for a sector in a recordable medium (e.g., 2048 bytes). Data blocks may or may not be encrypted. The host device can submit a command to write a data block to the recording device. In one example, a recording device is a disc drive capable of writing data to recordable media such as DVD-Video disc, a CD-RW, and the like.

As data blocks are received for recording, the data blocks can be addressed to be written in secure storage areas. In one embodiment, some data blocks to be written to secure storage areas may be encrypted while other data blocks to be written to the secure storage areas may not be encrypted. The recording device can be configured to first check whether the data block is to be written to a secure storage area. The device can make this determination based on the address in which the data block is to be written on the disc. The address can be provided by the host device as part of the write command. If the recording device determines that that data block is to be written in a secure storage area, the device can then check to see if the data block is encrypted. The determination can be made by checking an encryption indicator embedded in the data block.

Figure 1:
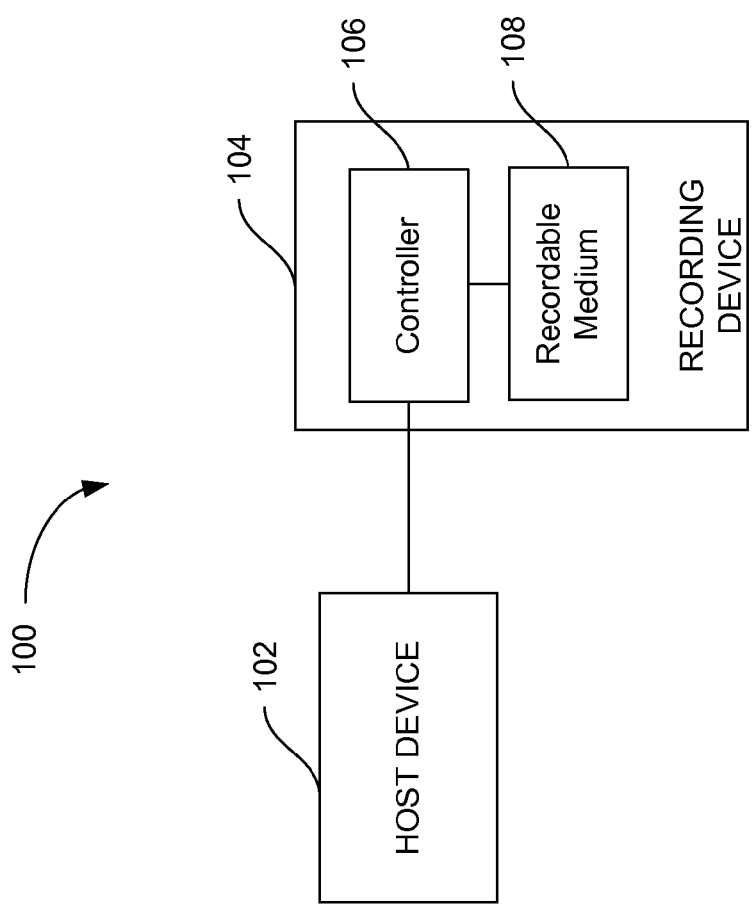
FIG. 1 illustrates a component diagram of a host device and a recording device according to one embodiment.

FIG. 1 illustrates a component diagram of a host device and a recording device according to one embodiment. The host device 102 can be for example a desktop computer, a laptop, or any other computing device. The host device 102 can be configured with one or more software applications that require reading and writing from a recordable medium 108 in the recording device 104.

In one embodiment, the host device 102 can establish secure storage areas. For example, prior to writing of data to the recordable medium 108, the host device 102 can send a data range indicative of an encrypted memory area within the recordable medium. In another example, the recordable medium 108 can send an address and the number of bytes that the secure storage area occupies In addition, the host device 102 can also transmit decryption keys to the recording device 104.

In addition, the host device 102 is configured to submit a write command to the recording device 104. The write command can include one or more data blocks to be written to the recording device 104. In one implementation, the write command can include the address in the recordable medium 108 where a given data block is to be written. Furthermore, the write command can also include decryption keys, or data to derive decryption keys. The recording device 104 can be configured with a controller 106 that operates to read and write the recordable medium 108. The controller 106 can be configured to receive the data range from a host computer. As stated above, the data range can be indicative of a secure storage area. In one embodiment, the secure storage area can be a portion of a memory of the recordable medium to be recorded with encrypted data. The controller 106 can be further configured to receive a write command from the host device 102.

As previously mentioned, the write command can include one or more data blocks to be written to the recordable medium and a memory address indicative of a start address where each data block is to be written on the recordable medium 108. Upon receiving a command, the controller 106 can be configured to determine whether the data block (or a portion thereof) falls within the data range. In other words, the controller 106 can compare the memory address and the data range to determine whether the data block falls within the data range.

If the data block does not fall within the data range, the data block is written normally. Otherwise, a sector header can be recorded with the encryption key. In addition, a second determination is performed when the data block falls within the data range. The second determination can comprise a check as to whether an encryption indicator is present in the data block. The encryption indicator indicates whether the data in the data block is encrypted. If the encryption indicator is present in the data block, then when writing the user data on a sector of the recordable medium 108, the sector header can further be recorded with an indicator that the sector is encrypted.

In one embodiment, it can be first determined whether the data block (or a portion thereof) falls within the data range, and subsequently, it can be checked as to whether an encryption indicator is present in the data block. In another embodiment, it can first be checked as to whether an encryption indicator is present in the data block, and subsequently, it can be determined whether the data block (or a portion thereof) falls within the data range. In yet another embodiment, the presence of the encryption indicator in the data block can be checked in parallel to the determining whether the data block falls within the data range. In another embodiment, the aforementioned determinations can be carried out in any order.

Figure 2A:
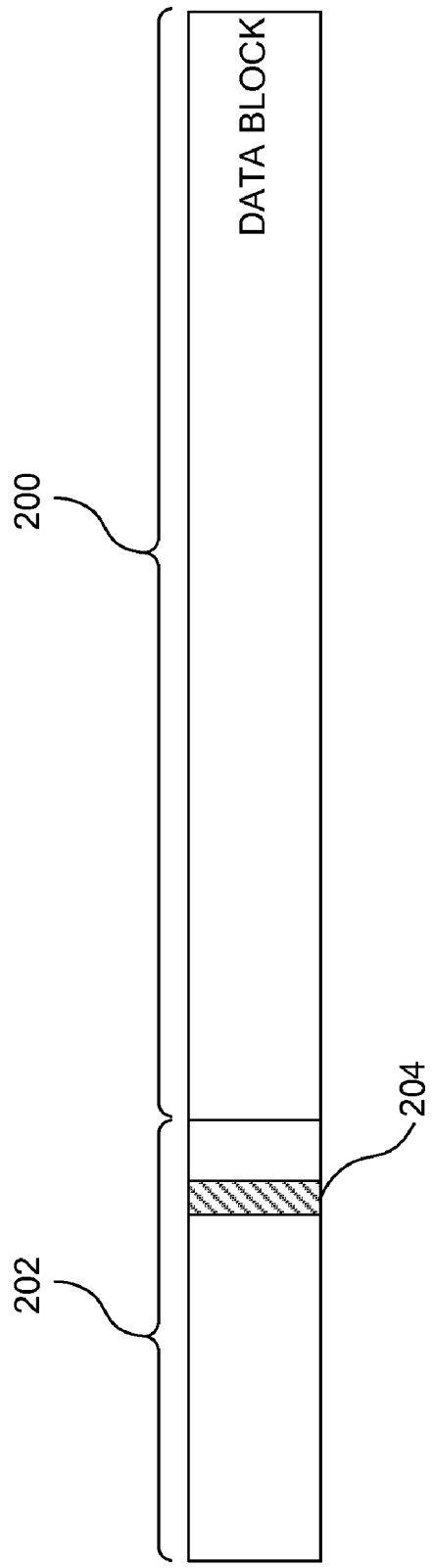
FIGS. 2A and 2B illustrate diagrams of a data block to be written to the recordable medium according to one embodiment.
Figure 2B:
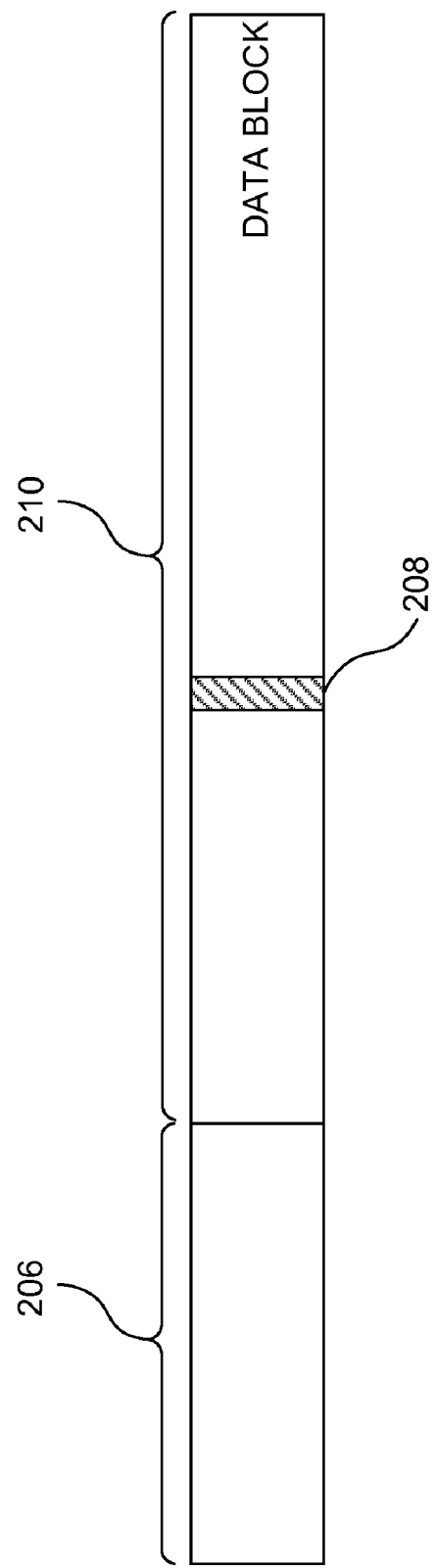

FIGS. 2A and 2B illustrate diagrams of a data block to be written to the recordable medium according to one embodiment. Data block 200 is an exemplary data block that contains data to be written to a physical sector in the recordable medium. In addition, a header 202 containing encryption keys and an encryption indicator 204 can also be written to the physical sector. Data block 210 is an exemplary data block that can have an associated header 206. The header 206 can in turn include an encryption indicator 208 that is at a particular location within the data block, and not necessarily in the header. As such, the encryption indicator 208 can be found based on a pre-established protocol, or by indicating the address of the encryption indicator 208 to a device that seeks to access the encryption indicator 208.

Figure 3:
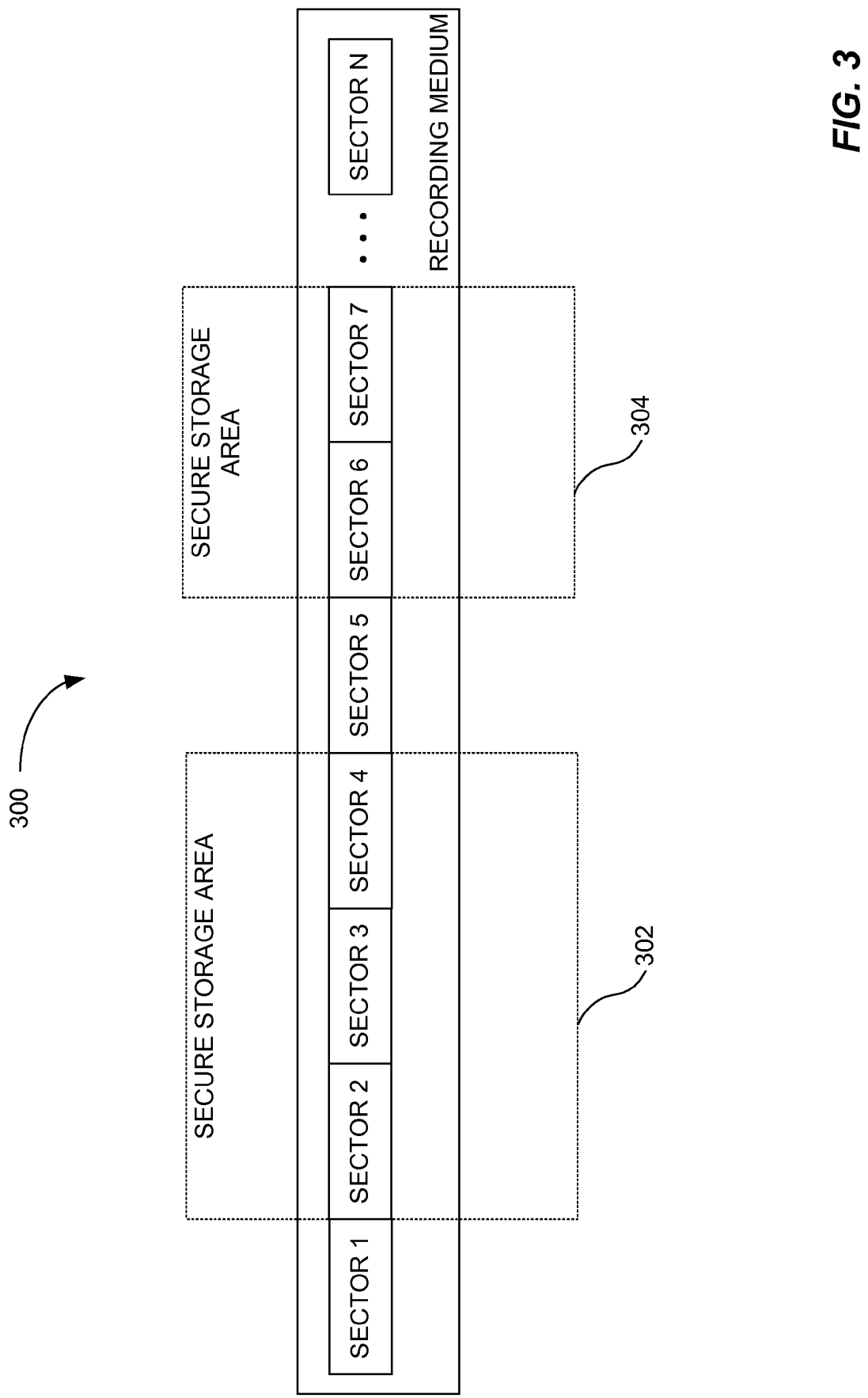
FIG. 3 illustrates one or more secure storage areas in a recordable medium according to one embodiment.

FIG. 3 illustrates one or more secure storage areas in a recordable medium according to one embodiment. In one example, the recordable medium 300 includes one or more sectors in which data can be recorded. The host device 102 can give an indication of which areas in the recordable medium are secure storage areas, and optionally provide a decryption key. Therefore when data is written on given sectors of such secure storage areas, data can be encrypted and written with a decryption key that can be used at reading time. The host device 102 can be configured to indicate to the controller 102 which areas in the recordable medium are secure storage areas. For instance, secure storage areas 302, 304 can be identified by a starting address and the number of sectors thereafter. In another example, the secure storage areas 302, 304 can be identified by a starting address and an ending address. In another example, the decryption key may be predetermined by the controller based on other factors (such as unique media properties), and optionally may be overridden by the host device.

In one embodiment, some of the sectors within a secure storage area are encrypted, while other sectors within that same area are not encrypted. For instance, for secure storage area 302, Sector 2 and Sector 4 can be written with encrypted data, while Sector 3 is not encrypted. In another embodiment, all of the sectors within a secure storage area are encrypted. For example, for secure storage area 302, Sector 2, 3 and Sector 4 can be written with encrypted data. In order to determine which sectors are to be recorded with encrypted data, the encryption indicator in each data block can be analyzed. If the encryption indicator indicates that the data block is encrypted, then the appropriate data is prepared to be written in the corresponding sector. For instance, the decryption key and a decryption indicator are embedded in the data block and written in the corresponding sector of the recordable medium.

Figure 4:
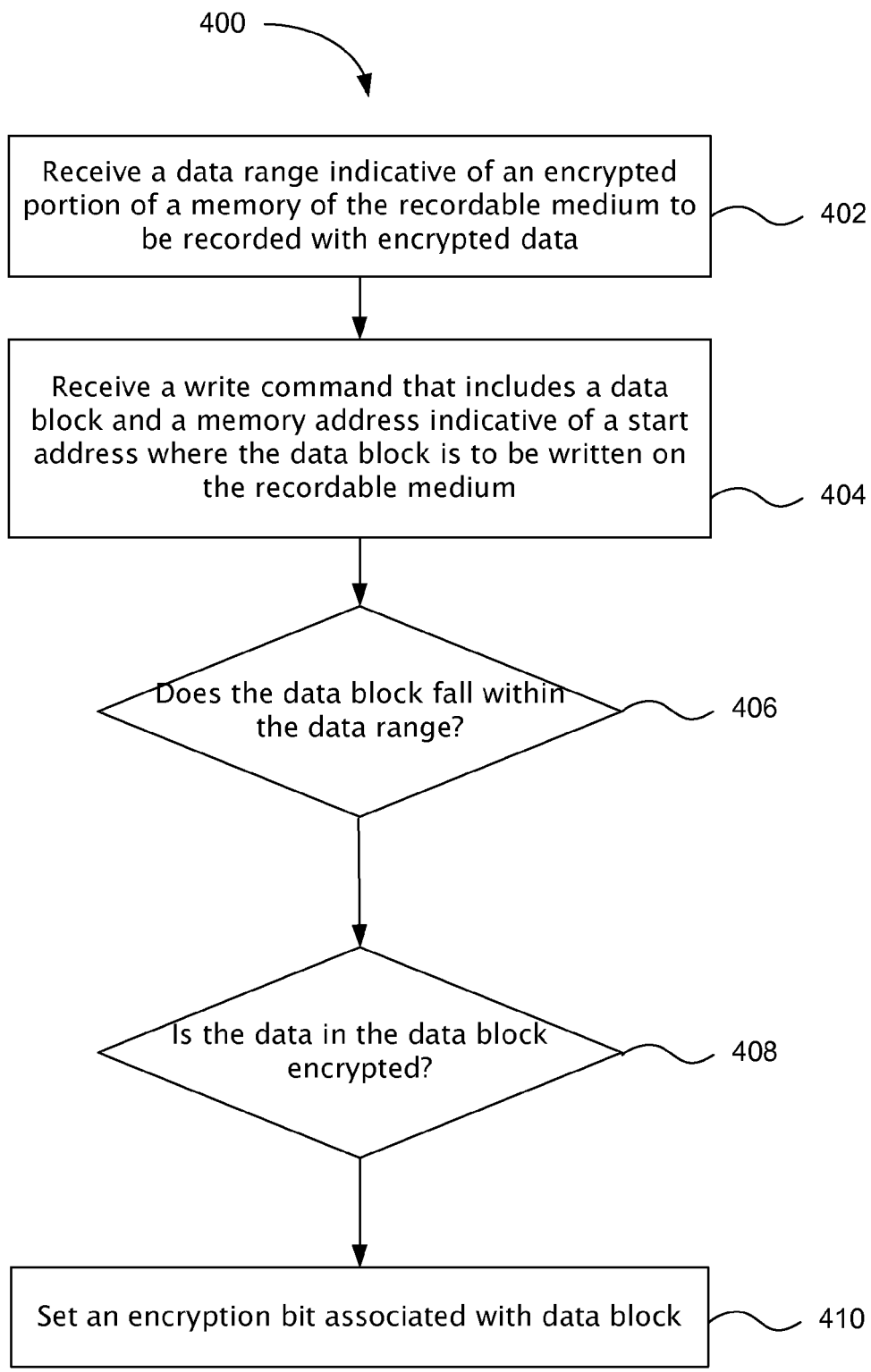
FIG. 4 illustrates a flow diagram of a process for writing encrypted data to a recordable medium according to one embodiment.

FIG. 4 illustrates a flow diagram of a process for writing encrypted data to a recordable medium according to one embodiment. At process block 402, a data range can be received from a host computer. The data range can be indicative of a portion of a memory of the recordable medium to be recorded with encrypted data. Process 400 continues at process block 404.

At process block 404, a write command is received from the host computer. The write command can include a data block to be written to the recordable medium and a memory address indicative of a start address where the data block is to be written on the recordable medium. Process 400 continues at decision block 406.

At decision block 406, it is determined whether the data block falls within the data range. In one aspect, the determination is made by comparing the memory address and the data range. If the data block falls within the data range process 400 continues at process block 408. Otherwise, the data block can be written to the recordable medium without further checking or processing.

At decision block 408, it is determined if the encryption indicator indicates that the data in the at least one data block is encrypted. In one embodiment, such determination can be performed by checking an encryption indicator in the data block. If the encryption indicator indicates that the data in the at least one data block is encrypted process 400 continues at process block 410. At process block 410, a set of bits of the sector header can be set based on the encryption indicator in the data block.

FIG. 5 illustrates a component diagram of a computing device for implementing one or more embodiments. The computing device 500 can be utilized to implement one or more computing devices, computer processes, or software modules described herein. In one example, the computing device 500 can be utilized to process calculations, execute instructions, receive and transmit digital signals. In another example, the computing device 500 can be utilized to process calculations, execute instructions, receive and transmit digital signals, receive and transmit search queries, and hypertext, compile computer code, as required by the consumer host device 102, and the controller 106.

The computing device 500 can be any general or special purpose computer now known or to become known capable of performing the steps and/or performing the functions described herein, either in software, hardware, firmware, or a combination thereof.

In its most basic configuration, computing device 500 typically includes at least one central processing unit (CPU) 502 and memory 504. Depending on the exact configuration and type of computing device, memory 504 may be volatile (such as RAM), non-volatile (such as ROM, flash memory, etc.) or some combination of the two. Additionally, computing device 500 may also have additional features/functionality. For example, computing device 500 may include multiple CPU's. The described methods may be executed in any manner by any processing unit in computing device 500. For example, the described process may be executed by both multiple CPU's in parallel.

Computing device 500 may also include additional storage (removable and/or non-removable) including, but not limited to, magnetic or optical disks or tape. Computer storage media includes volatile and nonvolatile, removable and non-removable media implemented in any method or technology for storage of information such as computer readable instructions, data structures, program modules or other data. Memory 504 and storage 506 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 500. Any such computer storage media may be part of computing device 500.

Computing device 500 may also contain communications device(s) 512 that allow the device to communicate with other devices. Communications device(s) 512 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 500 may also have input device(s) 510 such as keyboard, mouse, pen, voice input device, touch input device, etc. Output device(s) 508 such as a display, speakers, printer, etc. may also be included. All these devices are well known in the art and need not be discussed at length.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A method of writing to a recordable medium, comprising:
   receiving a data range from a host device, wherein the data range is indicative of a portion of a memory of the recordable medium to be recorded with encrypted data;
   receiving a write command from the host device, the write command including at least one data block to be written to the recordable medium and a memory address indicative of a start address where the at least one data block is to be written on the recordable medium;
   comparing the memory address and the data range to determine whether the at least one data block falls within the data range;
   checking an encryption indicator in the at least one data block to determine whether the data on the at least one data block is encrypted; and
   if the encryption indicator indicates that the data in the at least one data block is encrypted and if the at least one data block falls within the data range, setting an encryption bit associated with the at least one data block.

2. The method of claim 1, further comprising writing the encryption bit to the recordable medium.

3. The method of claim 2, wherein the encryption bit is stored in a sector header corresponding to the at least one data block.

4. The method of claim 1, wherein the data is video data or audio data.

5. The method of claim 1, further comprising writing to the recordable medium a decryption key associated with the data range if the at least one data block falls within the data range.

6. The method of claim 5, wherein the encryption key is stored in a sector header corresponding to the at least one data block.

7. The method of claim 1, wherein receiving the data range comprises receiving a start address and a number of sectors.

8. The method of claim 1, wherein receiving the data range comprises receiving a start address and an end address.

9. The method of claim 1, wherein receiving a write command comprises receiving an indicator address indicative of where the encryption indicator is located within the data block.

10. The method of claim 1, wherein checking the encryption indicator in the at least one data block to determine whether the data on the at least one data block is encrypted comprises locating a pre-determined indicator address within the data block.

11. A computer-readable storage device having computer-executable instructions stored thereon which, when executed by a computer, cause the computer to:
   receive a data range from a host device, wherein the data range is indicative of a portion of a memory of the recordable medium to be recorded with encrypted data;
   receive a write command from the host device, the write command including at least one data block to be written to the recordable medium and a memory address indicative of a start address where the at least one data block is to be written on the recordable medium;

compare the memory address and the data range to determine whether the at least one data block falls within the data range;

check an encryption indicator in the at least one data block to determine whether the data on the at least one data block is encrypted; and if the encryption indicator indicates that the data in the at least one data block is encrypted and if the at least one data block falls within the data range, set an encryption bit associated with the at least one data block.

12. The computer-readable storage device of claim 11, having a further instructions stored thereon which, when executed by a computer, cause the computer to write the encryption bit to the recordable medium.

13. The computer-readable storage device of claim 12, wherein the encryption bit is stored in a sector header corresponding to the at least one data block.

14. The computer-readable storage device of claim 11, wherein the data is video data or audio data.

15. The computer-readable storage device of claim 11, having a further instructions stored thereon which, when executed by a computer, cause the computer to write to the recordable medium a decryption key associated with the video range if the encryption indicator indicates that the data in the at least one data block is encrypted.

16. The computer-readable storage device of claim 11, wherein the data range is received as a start address and a number of sectors.

17. The computer-readable storage device of claim 11, wherein the data range is received as a start address and an end address.

18. The computer-readable storage device of claim 11, wherein the write command is received with an indicator address indicative of where the encryption indicator is located within the data block.

19. The computer-readable storage device of claim 11, having a further instructions stored thereon which, when executed by a computer, cause the computer to locate a predetermined indicator address within the data block when the encryption indicator is checked.

20. A method of writing to a recordable medium, comprising:

receiving a data range from a host device, wherein the data range is indicative of a portion of a memory of the recordable medium to be recorded with encrypted data;

receiving a write command from the host device, the write command including at least one data block to be written to the recordable medium and a memory address indicative of a start address where the at least one data block is to be written on the recordable medium;

comparing the memory address and the data range to determine whether the at least one data block falls within the data range;

if the at least one data block falls within the data range, checking an encryption indicator to determine whether the data on the at least one data block is encrypted; and if the encryption indicator indicates that the data in the at least one data block is encrypted, setting an encryption bit associated with the at least one data block.

* * * * *